(12) United States Patent
Lindoff et al.

(10) Patent No.: US 6,463,107 B1
(45) Date of Patent: Oct. 8, 2002

(54) METHODS AND APPARATUSES FOR SYNCHRONIZATION AND MODULATION TYPE DETECTION

(75) Inventors: Bengt Lindoff, Lund (SE); Niklas Stenström, Helsingborg (SE); Anders Khullar, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/340,254

(22) Filed: Jul. 1, 1999

(51) Int. Cl.$^7$ .............................. H03D 1/00; H04L 27/06
(52) U.S. Cl. ..................... 375/343; 375/213; 375/340; 375/368
(58) Field of Search ................. 375/343, 224, 375/220, 213, 340, 354, 365, 368

(56) References Cited

U.S. PATENT DOCUMENTS

| | | | |
|---|---|---|---|
| 4,933,958 A | | 6/1990 | Brandl et al. ............... 375/331 |
| 5,289,476 A | | 2/1994 | Johnson et al. ............. 714/775 |
| 5,600,673 A | | 2/1997 | Kimura et al. .............. 375/224 |
| 5,805,642 A | | 9/1998 | Wei et al. .................... 375/340 |
| 5,940,438 A | * | 8/1999 | Poon et al. .................. 375/222 |
| 6,192,070 B1 | * | 2/2001 | Poon et al. .................. 375/222 |

FOREIGN PATENT DOCUMENTS

| | | |
|---|---|---|
| DE | 27 52 468 | 5/1979 |
| EP | 0 562 422 | 9/1993 |
| EP | 0 727 885 | 8/1996 |
| EP | 0 881 804 | 12/1998 |
| EP | 0 895 387 | 2/1999 |
| JP | 2 020 153 | 1/1990 |
| JP | 6 284 642 | 10/1994 |
| WO | 96/13910 | 10/1995 |

OTHER PUBLICATIONS

Paris et al., "Modulation Classification in Unknown Dispersive Environments", IEEE International Conference on Acoustics, Speech adn Signal Processin, Apr. 21–24, 1997, pp. 3853–3856, New York.
Hwang, Polydoros: "Advanced Methods for Digital Quadrature and Offset Modulation Classification" The Military Communications Confernce 1991, Nov. 4–7, 1991, pp. 841–845, New York.
Proakis, J., "Digital Communication", Chapter 5 and 5.2, McGraw–Hill Inc., New York, 1995.

\* cited by examiner

Primary Examiner—Mohammad H. Ghayour
(74) Attorney, Agent, or Firm—Burns, Doane, Swecker & Mathis, L.L.P.

(57) ABSTRACT

In a communication system including a transmitter and a receiver, the receiver is synchronized with the transmitter, and a modulation type in a signal transmitted by the transmitter and received by the receiver is detected. A first portion of the received signal is correlated with one or more signals representing modulation types used by the communication system to detect the type of modulation being used in the received signal. Synchronization is established between the transmitter and the receiver. The first portion may be correlated with each of one or more different signals representing various modulation types used in the communication system to detect the type of modulation used. Alternately, the first portion of the received signal may be derotated by different amounts to produce a plurality of derotated signals that are correlated with the signal representing modulation used by the communication system in order to detect the type of modulation used. If the correlation does not result in a determination of the modulation type, either a predetermined modulation type is selected as the modulation type, or the decision of the modulation type is made at a later stage based, e.g., on a comparison of signal qualities or equalization results.

22 Claims, 6 Drawing Sheets

METHODS AND APPARATUSES FOR SYNCHRONIZATION AND MODULATION TYPE DETECTION

BACKGROUND

This invention relates generally to methods and apparatuses for synchronization and modulation type detection. More particularly, this invention relates to methods and apparatuses for synchronization and modulation type detection in a communication system.

In some cellular communication systems, it can be advantageous to use different modulation types for exchanging information, e.g., between transmitter such as a base station and a receiver such as a mobile station or a fixed cellular terminal. For instance, some modulation types may perform well against interference and background noise at high velocities of the mobile station. This kind of modulation type is normally associated with a low data rate. Other modulation types may provide higher data rates but may be more sensitive to noise, etc. Such modulation types are only suitable at low velocities of the mobile station and in limited areas where the noise is small compared to the received signal strength, e.g., offices or cities.

One example of a cellular system using different modulation types is the proposed EDGE (Enhanced Data Rates for Global System for Mobile Communication (GSM) Evolution) system in which GMSK (the modulation type used in GSM systems today) will be used as the robust low data rate modulation and offset 8-PSK will be used as the modulation for higher data rates.

In communication systems such as these, information is typically exchanged in bursts of a fixed length. Typically, the modulation type is the same within a burst. Using different modulation types in the same digital communication system requires detection of the modulation type used in a particular burst. One simple way to determine the modulation type is to use some kind of signaling between the transmitter and the receiver to indicate which modulation type is being used. However, this signaling decreases the information data rate and may therefore not be desirable. To avoid the need for this signaling, blind modulation detection may be used, requiring detection of the transmitted bits and the modulation type in the receiver. The complexity of the modulation detection device should be kept low in order to minimize the processing power required in the receiver. Additionally, the detection should be adapted to the received signal quality for a good trade-off between complexity and performance.

Various attempts have been made to detect modulation types. For example, U.S. Pat. No. 5,600,673 to Kimura et al. describes the use of phase differences between a recovered data clock and received data for discriminating modulation formats. U.S. Pat. No. 4,933,958 to Brandl et al. describes a similar technique for modulation detection. Neither of these patents addresses the problem of Inter Symbol Interference (ISI) which is common in present radio communication systems, due to multipath propagation of radio waves.

In cellular radio communication systems, it is important that the receiver be synchronized to the transmitter, i.e., the local time reference of the receiver should be synchronized to the time reference of the transmitter. For this purpose, synchronization signals are transmitted periodically by the transmitter. The receiver synchronizes itself with the transmitter, using the synchronization signals.

Therefore, there is a need for an efficient modulation detection technique that, in a simple and reliable way, detects the type of modulation used. Further, the detection unit should be reliable even under severe Inter Symbol Interference (ISI) conditions. To reduce the complexity of the receiver and thus minimize processing power, modulation type detection should be done as soon as possible after receipt of the signal, e.g., at the same time as synchronization.

SUMMARY

It is therefore an object of the invention to provide a simple and efficient way for detecting a type of modulation in a received signal. It is a further object of the invention to provide a modulation detection technique that is effective under severe interference conditions. It is yet a further object of the invention to provide a technique for performing or at least attempting modulation type detection simultaneously with synchronization.

According to exemplary embodiments, this and other objects are met by methods and apparatuses for synchronization and modulation detection in a communication system including a transmitter and a receiver. The receiver is synchronized with the transmitter, and a modulation type in a signal transmitted by the transmitter and received by the receiver is detected or an attempt is made to detect the modulation type. A first portion of the received signal is correlated with one or more signals representing modulation types used by the communication system to detect the type of modulation being used in the received signal. Synchronization between the transmitter and the receiver is established.

According to a first embodiment, the first portion of the received signal is correlated with each of one or more different signals representing various modulation types used in the communication system to detect the type of modulation used. According to a second embodiment, the first portion of the received signal is derotated by different amounts to produce a plurality of derotated signals that are correlated with a signal representing the modulation type used by the communication system in order to detect the type of modulation used. According to a third embodiment, if the modulation type is not detected by correlating the first portion of the received signal with each of one or more different signals representing the various modulation types, either a predetermined modulation type is determined to be the modulation type, or the modulation type is decided based, e.g., on a comparison of signal qualities or equalization results. According to a fourth embodiment, if the modulation type is not detected by correlating the derotated signals with a signal representing the modulation used by the communication system, either a predetermined modulation type is determined to be the modulation type, or the modulation type is decided based, e.g., on a comparison of signal qualities or equalization results.

BRIEF DESCRIPTION OF THE DRAWINGS

The features, objects, and advantages of this invention will become apparent by reading this description in conjunction with the accompanying drawings, in which like reference numerals refer to like elements and in which.

DETAILED DESCRIPTION

For illustrative purposes, the following description is directed to a cellular radio communication system, but it will be understood that this invention is not so limited and applies to other types of communication systems.

Figure 1A:
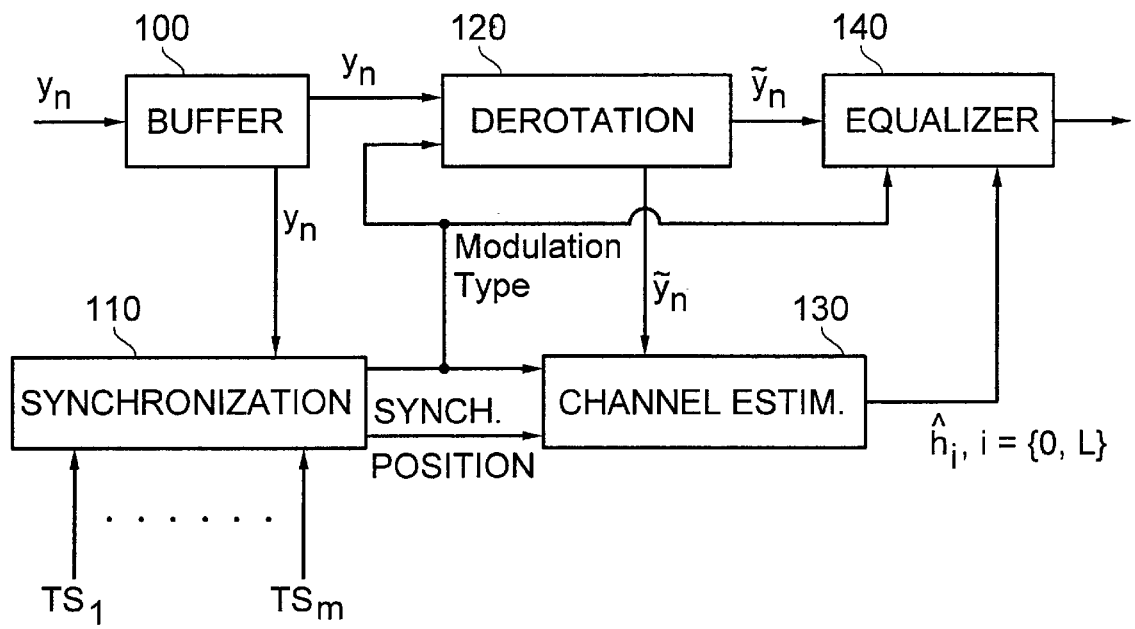
FIGS. 1A–1D illustrate apparatuses for synchronization and modulation type detection according to exemplary embodiments.

FIG. 1A illustrates a simultaneous synchronization and modulation type detection apparatus according to a first embodiment. This system may be included in a receiver such as a mobile station or a fixed cellular terminal. As shown in FIG. 1A, a received signal $y_n$ that has been down converted from a radio signal to a baseband signal and sampled at some rate, e.g., the symbol rate, with a predefined burst length is stored in a Buffer 100. The signal includes a first portion containing a known symbol pattern, e.g., a training sequence, and a second portion containing, e.g., data and/or control and signalling information. The first portion of the received signal $y_n$ within the burst, e.g., a training sequence, is output from the Buffer 100 to a Synchronization unit 110. A correlation between the different training sequences for each of the M possible modulation types used in the particular communication system, $TS_1, \ldots, TS_m$, and the received training sequence is performed in the Synchronization unit 110 to detect the type of modulation used in the received signal and to determine where the training sequence starts within the burst to establish burst synchronization. Mathematically, this can be explained in the following way.

Assume a burst of the received signal, down converted to baseband and sampled, can be written as:

$$y_n = h_0 u_n + \ldots + h_L u_{n-L} + e_n, \quad n=1, \ldots K \quad (1)$$

where K is the burst length, $H=[h_0, \ldots, h_L]$ is the radio channel, $u_k$ is the transmitted symbol at time k, and $e_n$ is some kind of noise. The correlation in the Synchronization unit 110 is done by computing:

$$c^i(k) = \frac{1}{n_{TS}^i} \sum_{n=1}^{n_{TS}^i} y(n+k) u_{TS}^i(n), \; k = n_0, \ldots, n_0+N, \; i=1, \ldots, M \quad (2)$$

where $c^i(k)$ is the k-lag cross-correlation between the received signal and $u^i_{TS}(n)$, which is the known training sequence for modulation type i, N is the synchronization window size, and M is the total number of possible modulation types used in the communication system. Since the radio channel is assumed to be of order L, the starting or synchronization position and modulation type can be chosen using the following equations:

$$Energy^i(k) = \sum_{n=k}^{k+L} |c^i(k)|^2, \; i=1, \ldots, M \quad (3)$$

Sync. Pos, Modulation Type=$k\epsilon[0,N]^{max}i\epsilon[1,M]^{max}Energy^i(k)|^2$ (4)

As can be seen from these equations, the synchronization position and modulation type that result in the largest energy correlation $Energy^i(k)$ are determined to be the correct modulation type and synchronization position. If M=1, this means only one type of modulation is being used. This is described, for example, in J. Proakis, Digital Communications. McGraw-Hill Inc., New York, 1995, and WO 96/13910.

Information representing the detected modulation type is fed to a Derotation unit 120 that rotates the second portion of the received signal, e.g., an information sequence, based on the detected modulation type. The rotation is performed in order to compensate for possible offsets introduced in the transmitter. For instance, assume that M=2, and the two modulation types that are used are either π/8 offset 8-PSK, so that the transmitted signal $u_t$ is given as:

$$u_t = e^{j\pi \frac{t}{8}} v_t \quad (5)$$

$$\text{where } v_t \epsilon \; e^{j\frac{\pi}{4}k_2}, k_t \epsilon \; (0, \ldots, 7) \quad (6)$$

or GMSK, i.e., the linear approximation, in which case the transmitted signal $u_t$ is given as:

$$u_t = e^{j\pi \frac{t}{2}} v_t \quad (7)$$

$$\text{where } v_t \epsilon \; (-1, 1). \quad (8)$$

In order to compensate for the offset, the received signal is derotated by $$e^{-j\frac{\pi t}{8}}$$

in the 8-PSK case and $$e^{-j\frac{\pi t}{2}}$$

in the GMSK case. The Synchronization unit 110 detects the modulation type and provides the Derotation unit 120 with the correct rotation factor, i.e., θ

$$\theta = \frac{\pi}{8}$$

in the 8-PSK case and θ

$$\theta = \frac{\pi}{2}$$

in the GMSK case. The rotated second portion of the received signal, $\tilde{y}_n = e^{-j\theta n} y_n$ together with the synchronization position and information representing the detected modulation type are then fed to a Channel Estimator 130 which estimates the channel based on the training sequence, the detected modulation type, and the derotated received signal. The estimated channel filter taps, $\hat{h}_i, i=0, \ldots, L$ are then fed to an Equalizer 140, together with the derotated signal $\tilde{y}_n$, for estimation of the transmitted signal $u_t$.

Figure 2A:
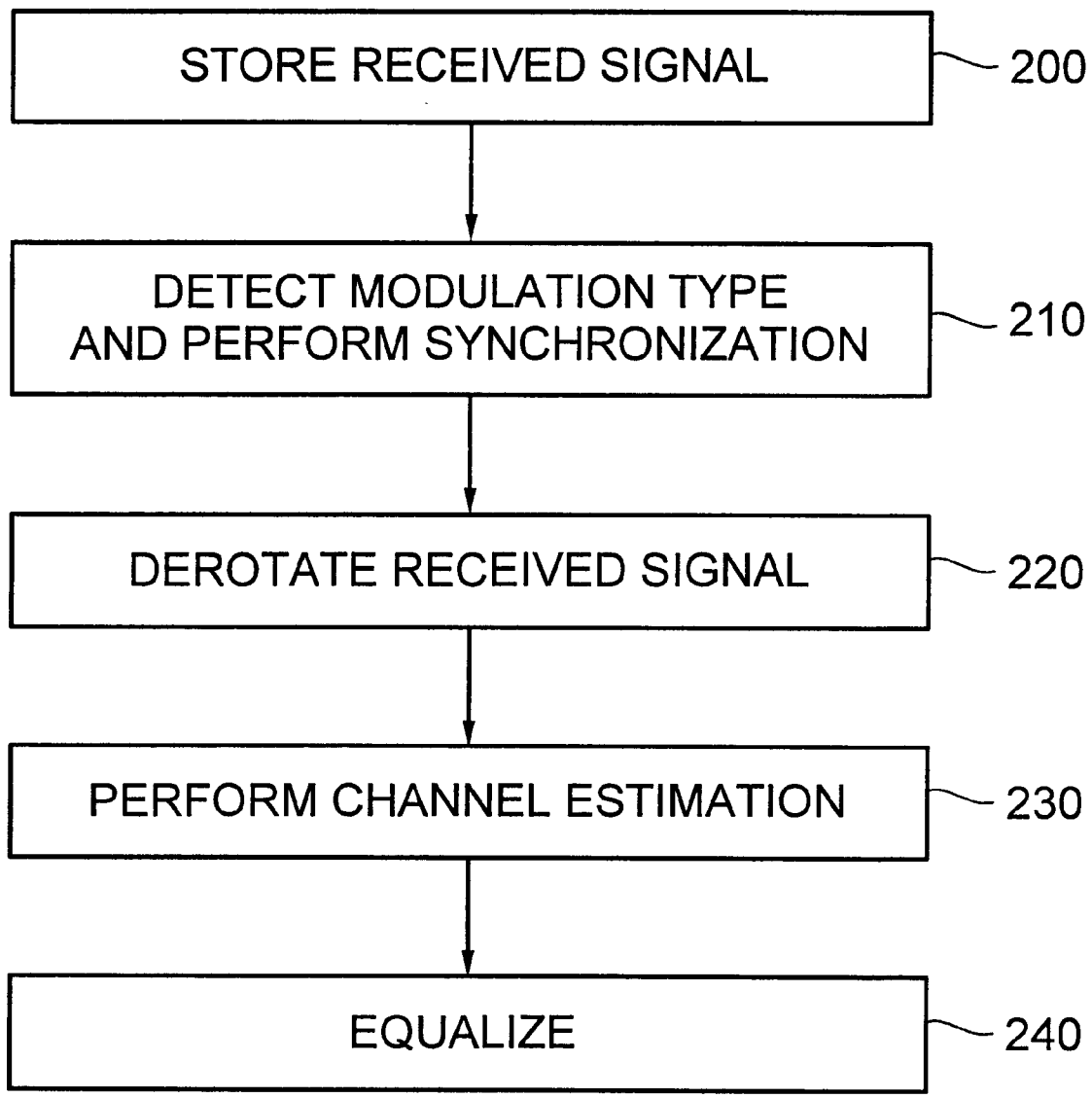
FIGS. 2A–2D illustrate methods for synchronization and modulation type detection according to exemplary embodiments.

FIG. 2A illustrates a method for simultaneous synchronization and modulation type detection according to the first embodiment. The method begins at step 200 at which a received signal is stored. At step 210, the first portion of the signal, e.g., the training sequence, is correlated with signals representing various modulation types to detect the modulation type of the received signal, and the start of the training sequence is determined to establish burst synchronization. At step 220, the second portion of the received signal, e.g., the information sequence, is derotated. At step 230, channel estimation is performed using information representing the determined modulation type, the derotated signal, and the detected synchronization position. Finally, at step 240, the channel is estimated, and the derotated signals are processed in an Equalizer.

In some communication systems, the same training sequence is used for all M different modulation types. In this case, the offset is the information that differs between the different modulation types. According to a second embodiment, the simultaneous synchronization and modulation type detection apparatus shown in FIG. 1B can be used for this type of system.

Figure 1B:
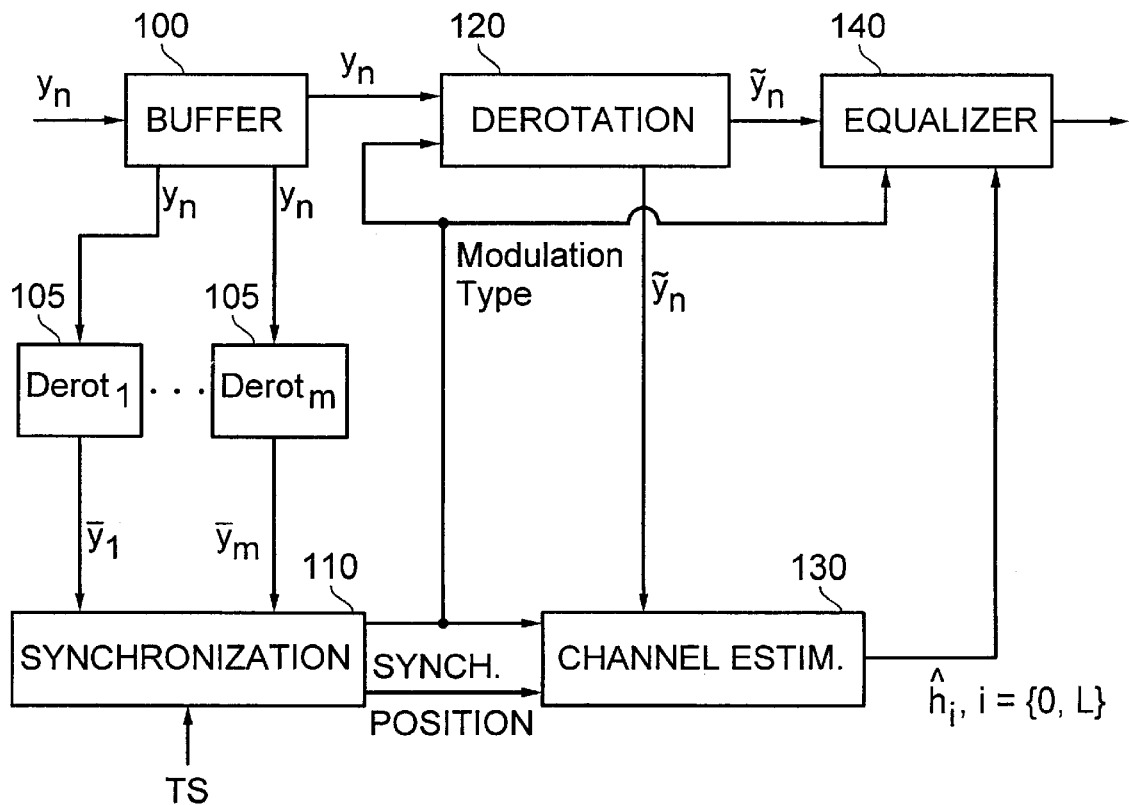

In the apparatus shown in FIG. 1B, similar to that shown in FIG. 1A, a received signal is stored in a Buffer 100. The first portion of the received signal, e.g., a training sequence, is output from the Buffer 100 to Derotator units 105 that derotate the first portion according to the different offsets for respective modulation types. As an example, assume that M=2 and the two modulation types that are used are either π/8 offset 8-PSK, so that the transmitted signal $u_t$ is given by Equation 5 or GMSK, i.e., (the linear approximation) in which case the transmitted signal $u_t$ is given by Equation 7. Then, the received signal $y_t$ is de-rotated by e $$e^{-j\frac{\pi t}{8}}$$

in $Derot_1$ 105 and by e $$e^{-j\frac{\pi t}{2}}$$

in $Derot_2$ 105. The derotated outputs $\bar{y}_1, \ldots, \bar{y}_M$ are then fed to a Synchronization unit 110 which performs a correlation between the training sequence TS of the communication system and each derotated received sequence $\bar{y}_1, \ldots, \bar{y}_M$ in order to find which modulation is used and where the training sequence starts within the burst, to establish burst synchronization. Information representing the detected modulation type is then fed to a Derotation unit 120 that rotates the second portion of the received signal, e.g., the information sequence, by an amount appropriate for the detected modulation type. The rotated received sequence, $\tilde{y}_n = e^{-j\theta n} y_n$, where θ is the decided offset (i.e., which determines the modulation type), together with the synchronization position and information representing the detected modulation type are then fed to the Channel Estimator 130 which estimates the channel based on the training sequence, the detected modulation type and the received signal. The estimated channel filter taps, $\hat{h}_i$, i=0, . . . ,L and information representing the detected modulation type are then fed to the Equalizer 140 together with $\tilde{y}_n$, for further processing.

Figure 2B:
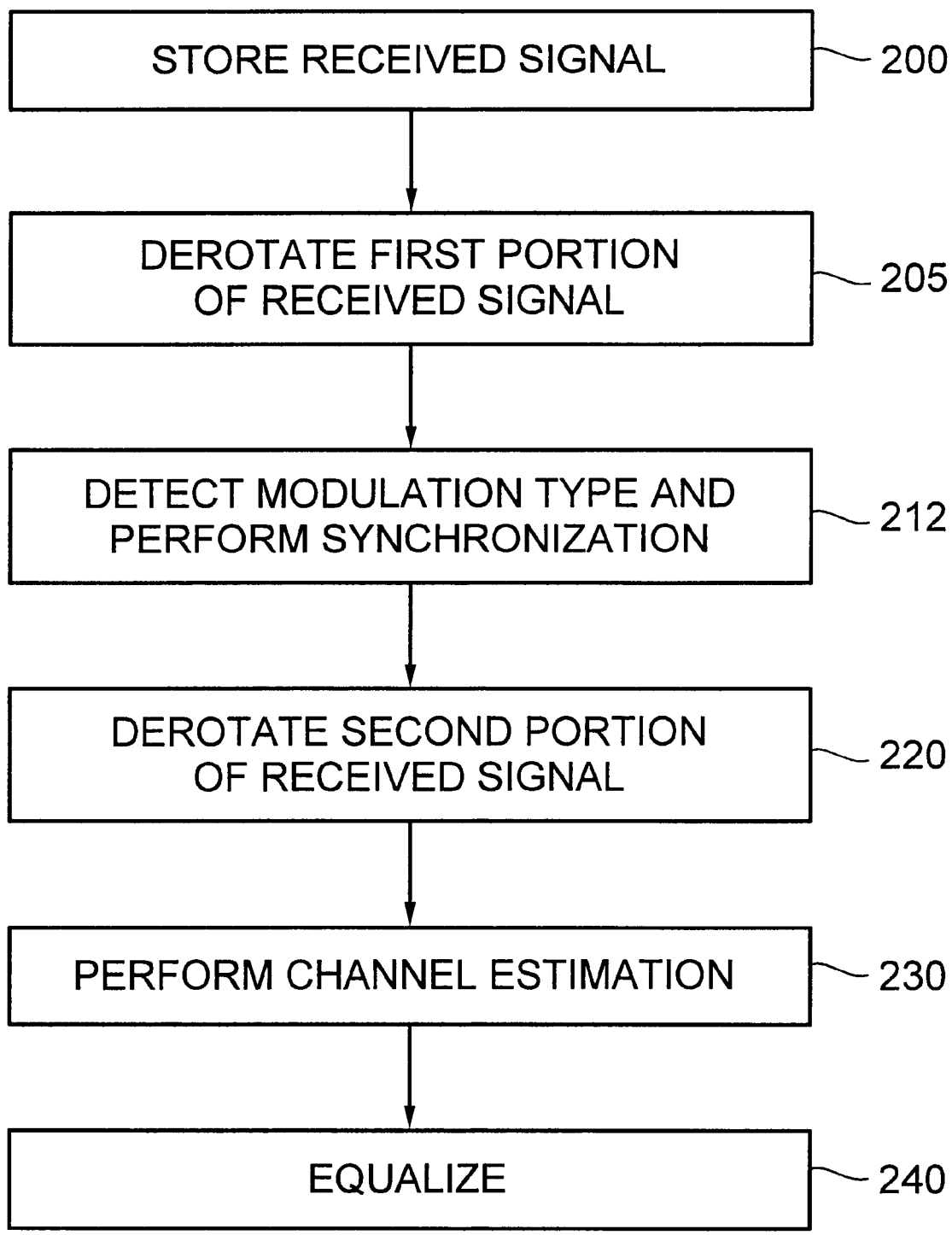

FIG. 2B illustrates a method for simultaneous synchronization and modulation type detection according to a second embodiment. Similar to the method shown in FIG. 2A, the method begins at step 200 at which a received signal is stored. At step 205, the first portion of the received signal, e.g., the training sequence, is derotated in a number of Derotators. At step 212, the derotated versions of the training sequence are correlated with a training sequence TS of the communication system to detect the modulation type of the received signal, and the start of the training sequence is determined to establish burst synchronization. At step 220, the second portion of the received signal, e.g., the information sequence, is derotated. At step 230, channel estimation is performed using information representing the determined modulation type, the derotated signal, and the detected synchronization position. Finally, at step 240, the channel estimate is processed with the derotated signal in an Equalizer.

In the embodiments above, modulation type detection is performed simultaneously with synchronization by correlating, e.g., the training sequence of the received signal with one or more signals representing modulation types used by the communication system to determine the type of modulation used in the received signal. If the received sequence contains too much noise, the modulation type detection may fail.

Figure 1C:
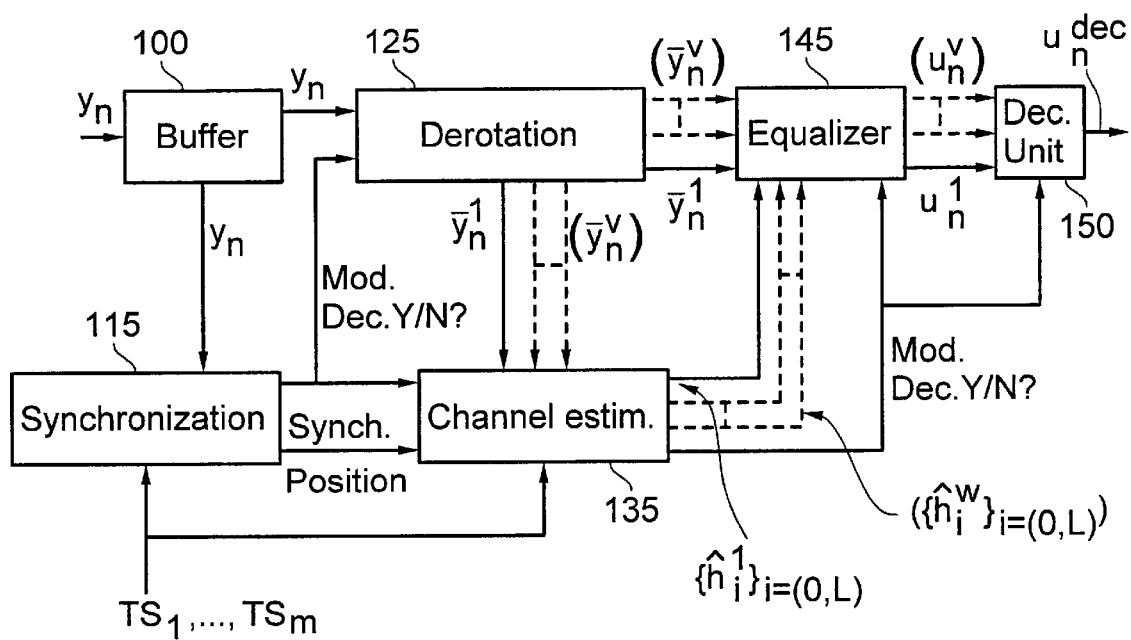

According to a third embodiment, an apparatus is provided that handles modulation type detection in case the modulation type detection by the Synchronization unit fails. FIG. 1C illustrates an apparatus for synchronization and modulation type detection according to the third embodiment. The system of FIG. 1C is similar to that shown in FIG. 1A, i.e., a received signal is stored in a Buffer 100, and the first portion of the received signal, e.g., a training sequence, is output from the Buffer 100 to the Synchronization unit 115. A correlation between the different training sequences for each of the M possible modulation types used in the particular communication system, $TS_1, \ldots, TS_m$, and the received training sequence is performed in the Synchronization unit 115 to determine where the training sequence starts within the burst, to establish burst synchronization. Since the radio channel is assumed to be of order L, the synchronization position for each possible modulation type can be computed by maximizing the energy within a window of length L using equations 3 and 4.

The energies for the best synchronization position for each possible modulation type are then compared to each other. Based on the energy distribution between the modulation types, a decision is made whether the modulation type is detected or not. For example, if:

$$\text{Energy}^i(k_{opt}^i) \gg \text{Energy}^n(k_{opt}^n), \text{ for all n i,} \qquad (9)$$

where $k^i_{opt}$ is the best synchronization position for modulation type i, and $k^n_{opt}$ is the best synchronization position for modulation type n, then a decision is made that the modulation type is modulation type i. On the other hand, if:

$$\text{Energy}^i(k_{opt}^i) \approx \text{Energy}^n(k_{opt}^n), \text{ for some n i} \qquad (10)$$

either a predetermined modulation type may be chosen as the modulation type, or the modulation type decision is not made at this point. For example, the most robust modulation type may be chosen as the modulation type, based on the assumption that the modulation type detection failed due to bad signal quality, implying the most robust modulation is probably used. For example, if GMSK and 8-PSK are the two possible modulation types, GMSK may be chosen as the modulation type since GMSK is quite insensitive to noise and thus more robust than 8-PSK. Hence, after this stage, either the modulation type is detected, or there are 1<v≦M modulation types left to choose between, where v represents a number of possible modulation types between 1 and the total number of possible modulation types M.

Information about whether the modulation type has been decided is then fed to a Derotator unit 125 that derotates the received samples, either based on the detected modulation type (indicated by a solid line) or according to all v modulation types that are still candidates (indicated by solid and dashed lines). The rotation is performed in order to compensate for offsets introduced in the transmitter, as described above. The rotated second portions of the received signal, $\bar{y}_n^1 \ldots \bar{y}_n^v$, together with the synchronization position, the training sequences, $TS_1 \ldots TS_m$, and information representing whether the modulation type is detected or not, are then fed to a Channel Estimator 135 which estimates the channel based on the training sequences, information regarding the modulation type, and the derotated received signal portions. The Channel Estimator 135 can be of least-Square type. If modulation type detection has been done in the Synchronization unit 115, the estimated channel filter taps, $\hat{h}_i$, i=0, ..., L are then fed to an Equalizer 145, together with the derotated signal $\bar{y}_n$, for further processing.

If no modulation detection has been done in the Synchronization unit 115, the Channel Estimator 135 estimates v channel estimates, one for each of the possible v modulation types. A new detection procedure based on some quality measures, such as for instance the estimated signal to noise ratio (SNR), for each of the v modulation types, obtained from the LS-estimate, may be performed in the Channel Estimator 135. The SNR for the modulation type may be defined as follows:

$$SNR_i = \frac{\sum_{k=0}^{L} |\hat{h}_k^i|^2}{\hat{\sigma}_i^2} \quad (11)$$

where $\hat{h}_k^i$, k=0, ..., L are the estimated channel filter taps for modulation type i, and $\hat{\sigma}_i^2$ is the estimated noise power when assuming modulation type i. For instance, if:

$$SNR_i \gg SNR_n, \text{ for all } n \neq i \quad (12)$$

then modulation type i is detected. The estimated channel filter taps $\hat{h}_i$, i=0, ..., L and the detected modulation type are then fed to the Equalizer together with $\bar{y}_n$ for further processing.

If no modulation type detection is performed in the Channel Estimator 135, because w candidates, where $1 < w \leq v$, have approximately the same SNR, the channel filter taps for all these w modulation types $\{\hat{h}_i^1\}_{i=(0,L)}, \ldots, \{\hat{h}_i^\omega\}_{i=(0,L)}$ are fed to the Equalizer 145. Then, w equalizations are performed in the Equalizer 145, and the results for each of the w modulation types together with the information regarding whether the modulation type is detected or not are fed to a Decision unit 150. In the Decision unit 150, a decision can be made which of the w modulation types the received signal is modulated with based on metrics from the Equalizer 145, the computation of metrics being known in the art.

Figure 2C:
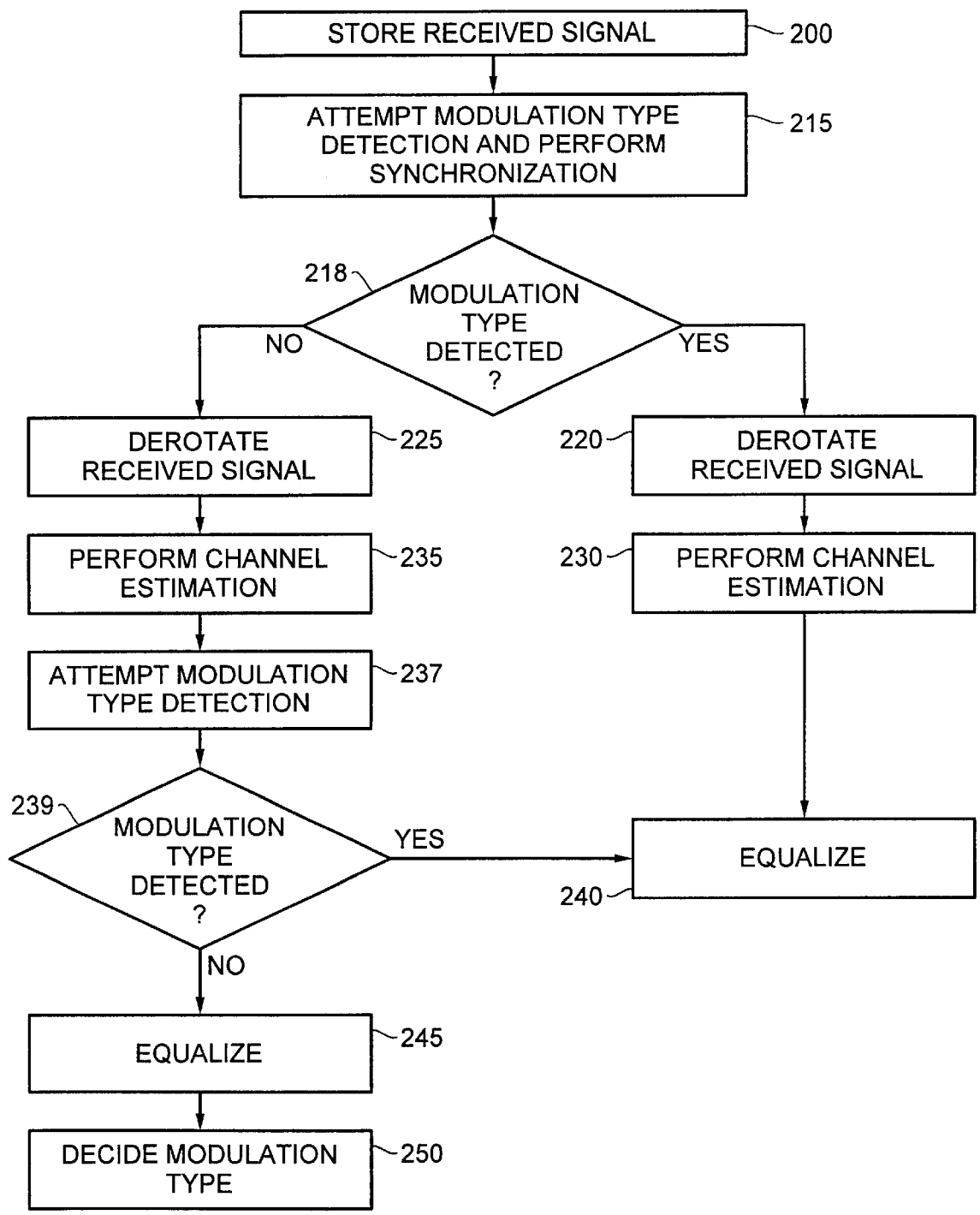

FIG. 2C illustrates a method for synchronization and modulation type detection according to the third embodiment. The method begins at step 200 at which a received signal is stored. At step 215, an attempt is made to correlate a portion of the signal, e.g., the training sequence, with signals representing various modulation types to detect the modulation type of the received signal, and the start of the training sequence is determined to establish burst synchronization. A determination is made at step 218 whether the modulation type is detected or not. If the type of modulation is detected, at step 220, the second portion of the received signal, e.g., the information sequence, is derotated. At step 230, channel estimation is performed using information representing the determined modulation type, the derotated signal, and the detected synchronization position. At step 240, the derotated signals are processed in an Equalizer.

If, at step 218, it is determined that the modulation type is not detected, the method proceeds to step 225 at which the second portion of the received signal is derotated according to all candidate modulation types. Next, at step 235, channel estimation is performed using the training sequences and the rotated second portions. At step 237, modulation type detection is again attempted, based on a comparison of signal qualities. At step 239, a determination is made whether the modulation type is detected. If so, equalization is performed at step 245. Otherwise, equalization is performed for all the candidate channel estimates at step 247, and the modulation type is finally decided at step 250.

Figure 1D:
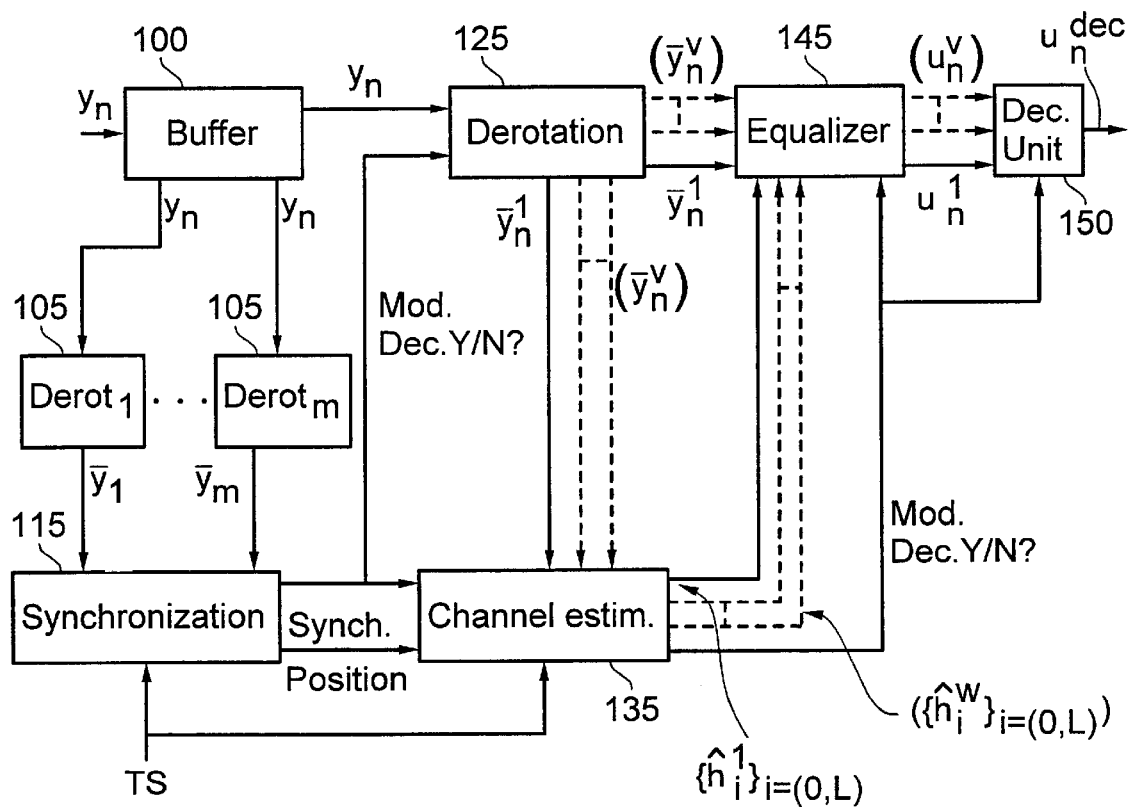

According to a fourth embodiment, the synchronization and modulation type detection apparatus shown in FIG. 1D can be used for a system in which the same training sequence is used for all M different modulation formats.

In the apparatus shown in FIG. 1D, similar to that shown in FIG. 1B, a received signal is stored in a Buffer 100. The first portion of the received signal, e.g., a training sequence, is output from the Buffer 100 to Derotator units 105 that derotate the first portion according to the different offsets for respective modulation types. The received signal $y_t$ is de-rotated by e $$e^{-j\frac{\pi t}{8}}$$

in Derot$_1$ 105 and by e $$e^{-j\frac{\pi t}{2}}$$

in Derot$_2$ 105. The derotated outputs $\bar{y}_1, \ldots, \bar{y}_M$ are then fed to a Synchronization unit 115 which performs a correlation between the training sequence TS of the communication system and each derotated received sequence $\bar{y}_1, \ldots, \bar{y}_M$ in order to find where the training sequence starts within the burst, to establish burst synchronization. The channel estimation, further derotation, equalization, and decision of modulation type detection are then performed as described above with reference to FIGS. 1B and 1C.

Figure 2D:
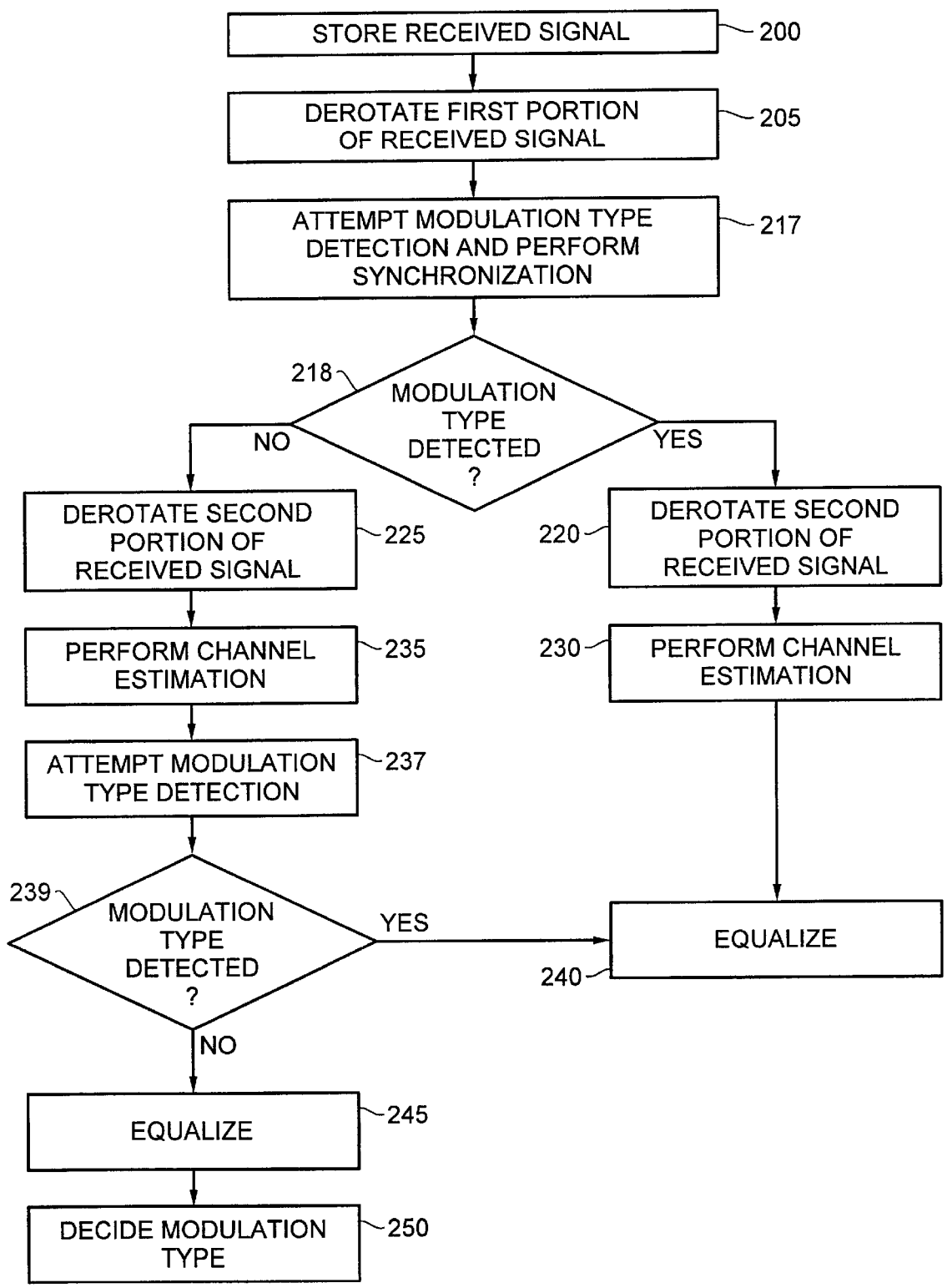

FIG. 2D illustrates a method for synchronization and modulation type detection according to a second embodiment. Similar to the method shown in FIG. 2B, the method begins at step 200 at which a received signal is stored. At step 205, the first portion of the received signal, e.g., the training sequence, is derotated in a number of Derotators. At step 217, an attempt is made to detect the modulation type by correlating the derotated versions of the training sequence, and the start of the training sequence is determined to establish burst synchronization. At step 218, a determination is made whether the modulation type was detected. If so, at step 220, the second portion of the received signal, e.g., the information sequence, is derotated. At step 230, channel estimation is performed using information representing the determined modulation type, the derotated signal, and the detected synchronization position. At step 240, the channel estimate is processed with the derotated signal in an Equalizer.

If, at step 218, it is determined that the modulation type is not detected, the process proceeds to step 225 at which the second portions of the received signal are derotated. Next, at step 235, channel estimation is performed using the training sequence and the rotated second portions. At step 237, modulation type detection is again attempted, based on a comparison of signal qualities. At step 239, a determination is made whether the modulation type is detected. If so, equalization is performed at step 245. Otherwise, equalization is performed for all the candidate channel estimates at step 247, and the modulation type is finally decided at step 250.

It will be appreciated that the order of steps described in the embodiments above is given by way of example only, and the order can be changed as desired. For example, the second portion of the received signal can be derotated at any convenient point before equalization.

This invention relates to all areas where synchronization and detection are used in digital communication. The invention proposes a fast and simple method for burst synchronization and modulation type detection. The invention is particularly suitable for mobile and base stations in cellular communication systems, but its applications are not limited to them.

It will be appreciated by those of ordinary skill in the art that this invention can be embodied in other specific forms without departing from its essential character. The embodiments described above should therefore be considered in all respects to be illustrative and not restrictive.

What is claimed is:

1. In a communication system including a transmitter and a receiver, an apparatus for synchronizing the receiver with the transmitter and detecting a modulation type in a signal transmitted by the transmitter and received by the receiver, the apparatus comprising:

a detector for detecting the type of modulation being used in the received signal by correlating a first portion of the received signal with one or more signals representing modulation types used by the communication system to; and a synchronization unit for synchronizing the receiver with the transmitter.

2. The apparatus of claim 1, wherein the detector correlates the first portion of the received signal with each of one or more different signals representing various modulation types used in the communication system to detect the type of modulation used.

3. The apparatus of claim 1, further comprising a derotator for derotating the received signal by different amounts to produce a plurality of derotated signals, wherein the detector correlates the signal representing a modulation used by the communication system with each derotated signal in order to detect the type of modulation used.

4. The apparatus of claim 1, further comprising a channel estimator for estimating a channel of the received signal based on the detected modulation type.

5. The apparatus of claim 1, further comprising a derotator for derotating a second portion of the received signal to compensate for offsets introduced by the transmitter.

6. The apparatus of claim 4, further comprising an equalizer for equalizing channel estimate and the second portion of the received signal.

7. The apparatus of claim 1, wherein modulation type detection and synchronization are performed simultaneously.

8. The apparatus of claim 1, wherein the first portion of the received signal is a training sequence, and a second portion of the received signal is an information sequence.

9. The apparatus of claim 1, further comprising a decision unit, wherein if the type of modulation is not detected by the detector, either a predetermined modulation type is determined to be the modulation type used or a decision of the modulation type is made by the decision unit.

10. The apparatus of claim 9, wherein the decision unit decides the modulation type based on a comparison of signal qualities.

11. The apparatus of claim 9, further comprising an equalizer, wherein the decision unit decides the modulation type based on equalization results.

12. In a communication system including a transmitter and a receiver, a method for synchronizing the receiver with the transmitter and detecting a modulation type in a transmitted signal received by the receiver, the method comprising the steps of:

detecting the type of modulation being used in the received signal by correlating a first portion of the received signal with one or more signals representing the type of modulation used by the communication system; and synchronizing the receiver with the transmitter.

13. The method of claim 12, wherein the step of detecting includes correlating the first portion with each of one or more different signal representing various modulation types used in the communication system to detect the type of modulation used.

14. The method of claim 12, further comprising a step of derotating the first portion by different amounts to produce a plurality of derotated signals, wherein the step of detecting includes correlating the signal representing the modulation used by the communication system with each derotated signal in order to determine the type of modulation used.

15. The method of claim 12, further comprising estimating a channel of the received signal based on the detected modulation type.

16. The method of claim 12, further comprising derotating a second portion of the received signal to compensate for offsets introduced by the transmitter.

17. The method of claim 15, further comprising equalizing the channel estimate and the second portion of the received signal.

18. The method of claim 12, wherein the steps of detecting and synchronizing are performed simultaneously.

19. The method of claim 12, wherein the first portion of the received signal is a training sequence, and a second portion of the received signal is an information sequence.

20. The method of claim 12, wherein if the type of modulation is not detected by the detecting step, either a predetermined modulation type is determined to be the modulation type used or the method includes a further step of deciding the modulation type.

21. The method of claim 20, wherein the deciding step decides the modulation type based on a comparison of signal qualities.

22. The method of claim 20, further comprising a step of equalizing, wherein the deciding step decides the modulation types based on equalization results.

* * * * *